Aug. 26, 1958     J. L. BREESE     2,849,188
FLOATLESS HEAT RESPONSIVE VALVE FOR LIQUID BURNERS
Filed July 11, 1955     6 Sheets-Sheet 1

Inventor
James L. Breese
by Parker & Carter
Attorneys

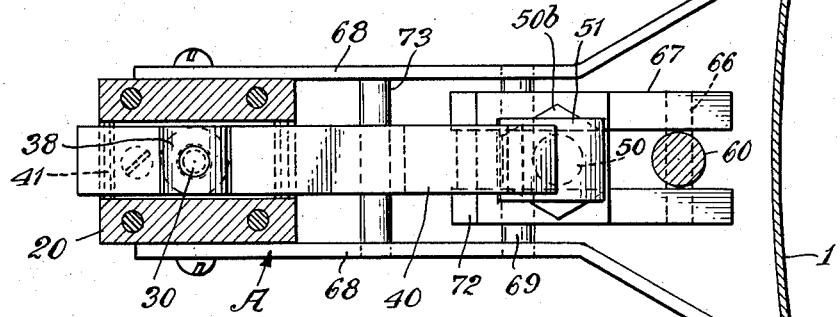
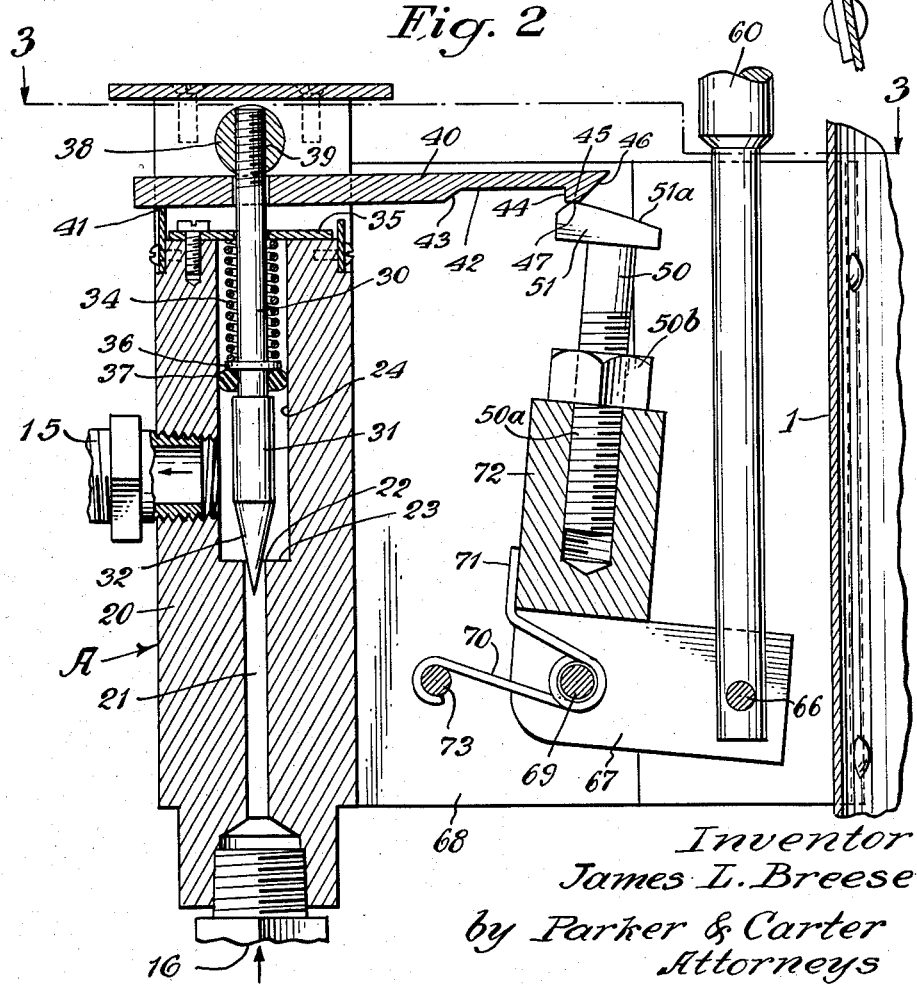

Aug. 26, 1958 J. L. BREESE 2,849,188
FLOATLESS HEAT RESPONSIVE VALVE FOR LIQUID BURNERS
Filed July 11, 1955 6 Sheets-Sheet 3

Inventor
James L. Breese
by Parker & Carter
Attorneys

Aug. 26, 1958      J. L. BREESE      2,849,188
FLOATLESS HEAT RESPONSIVE VALVE FOR LIQUID BURNERS
Filed July 11, 1955      6 Sheets-Sheet 4
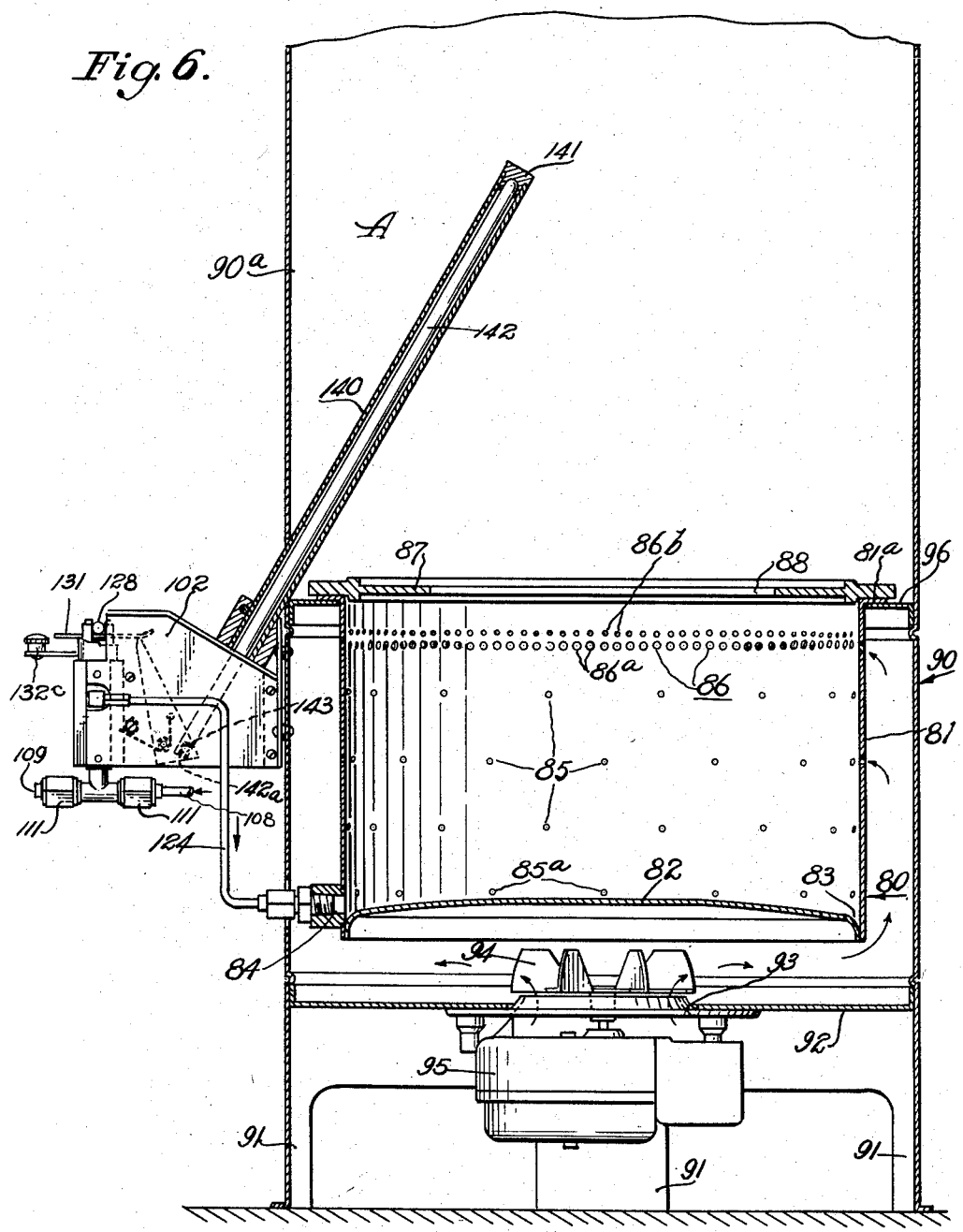
Inventor
James L. Breese
by Parker & Carter
Attorneys

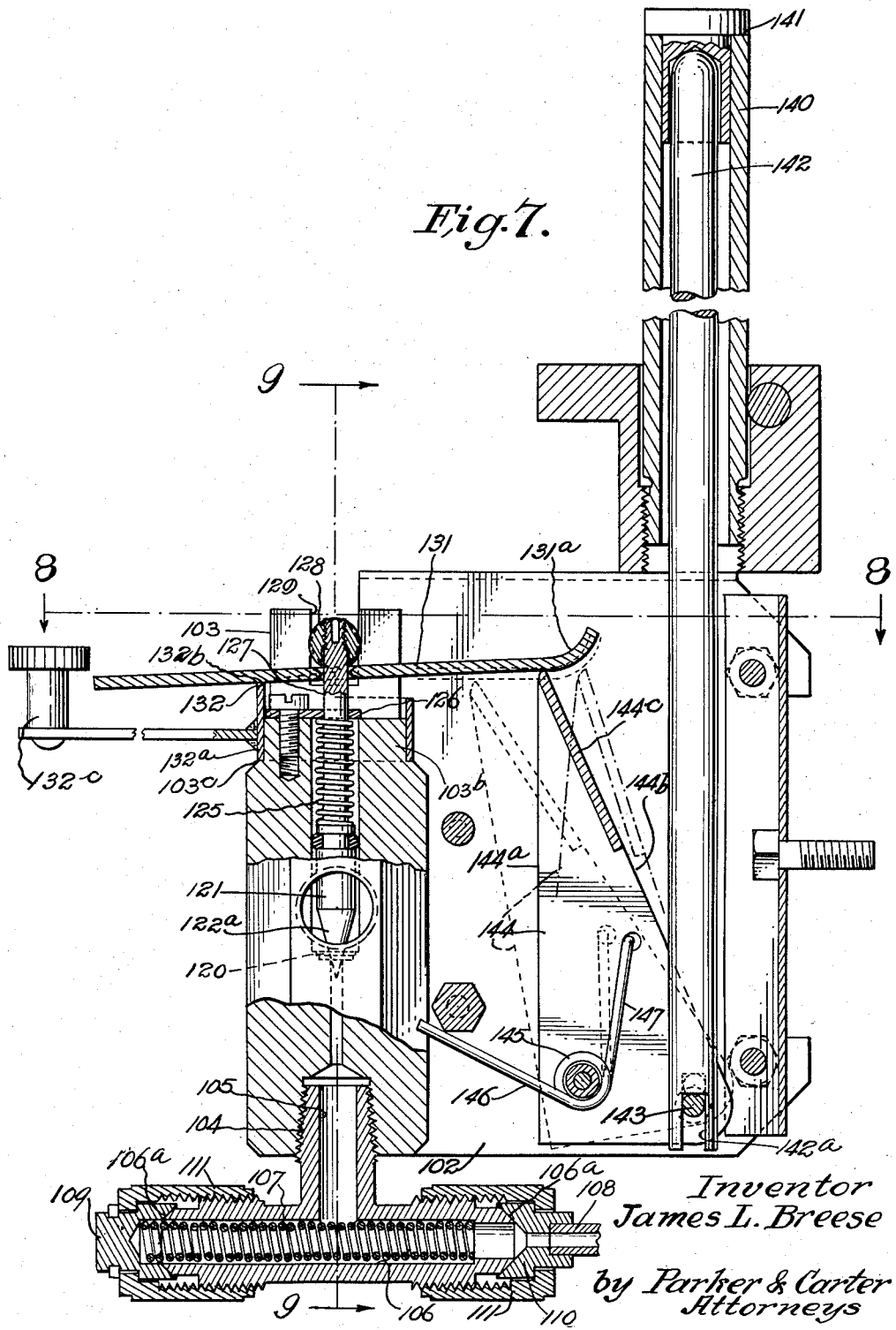

Aug. 26, 1958   J. L. BREESE   2,849,188
FLOATLESS HEAT RESPONSIVE VALVE FOR LIQUID BURNERS
Filed July 11, 1955   6 Sheets-Sheet 6

Inventor
James L. Breese by Parker & Carter
Attorneys

United States Patent Office 2,849,188
Patented Aug. 26, 1958

2,849,188

FLOATLESS HEAT RESPONSIVE VALVE FOR LIQUID BURNERS

James L. Breese, Santa Fe, N. Mex., assignor, by mesne assignments, to Breese Burners, Inc., Schiller Park, Ill., a corporation of Illinois Application July 11, 1955, Serial No. 520,944

10 Claims. (Cl. 236—96)

My invention relates to an improvement in burner control systems, and has for one purpose to provide heat responsive control means for controlling the flow of liquid fuel to a burner.

Another purpose is to provide such a system which is well adapted to space heaters, including space heaters in which pot type or hydroxylating burners are employed.

Another purpose is to provide such a control which "fails" in response both to overheating and to lack of heat, whereby a given control will shut off fluid fuel from a fuel supply, both in response to excess heat, and when the burner fire is extinguished.

Another purpose is to provide such a device in which a heat responsive element subjected directly to the heat of combustion is employed for controlling the flow of liquid fuel to a burner.

Another purpose is to provide a simple and efficient control for a liquid fuel line which can be used independently of float valves or the like.

Other purposes will appear from time to time in the course of the specification and claims.

The present application is a continuation-in-part of my copending abandoned application Serial No. 452,074, filed in the United States Patent Office on August 25, 1954, for "Floatless Heat Responsive Valve for Liquid Burners."

I illustrate the invention more or less diagrammatically in the accompanying drawings wherein:

Figure 2 is a vertical section, on an enlarged scale, on the line 2—2 of Figure 1;

Figure 3 is a section on the line 3—3 of Figure 2;

Figure 6 is a vertical section illustrating a variant form of my invention;

Figure 7 is a vertical section of said form corresponding to the showing of Figure 2 but showing a variant position of certain elements;

Like parts are indicated by like symbols throughout the specification and drawings.

Figures 1, 5:
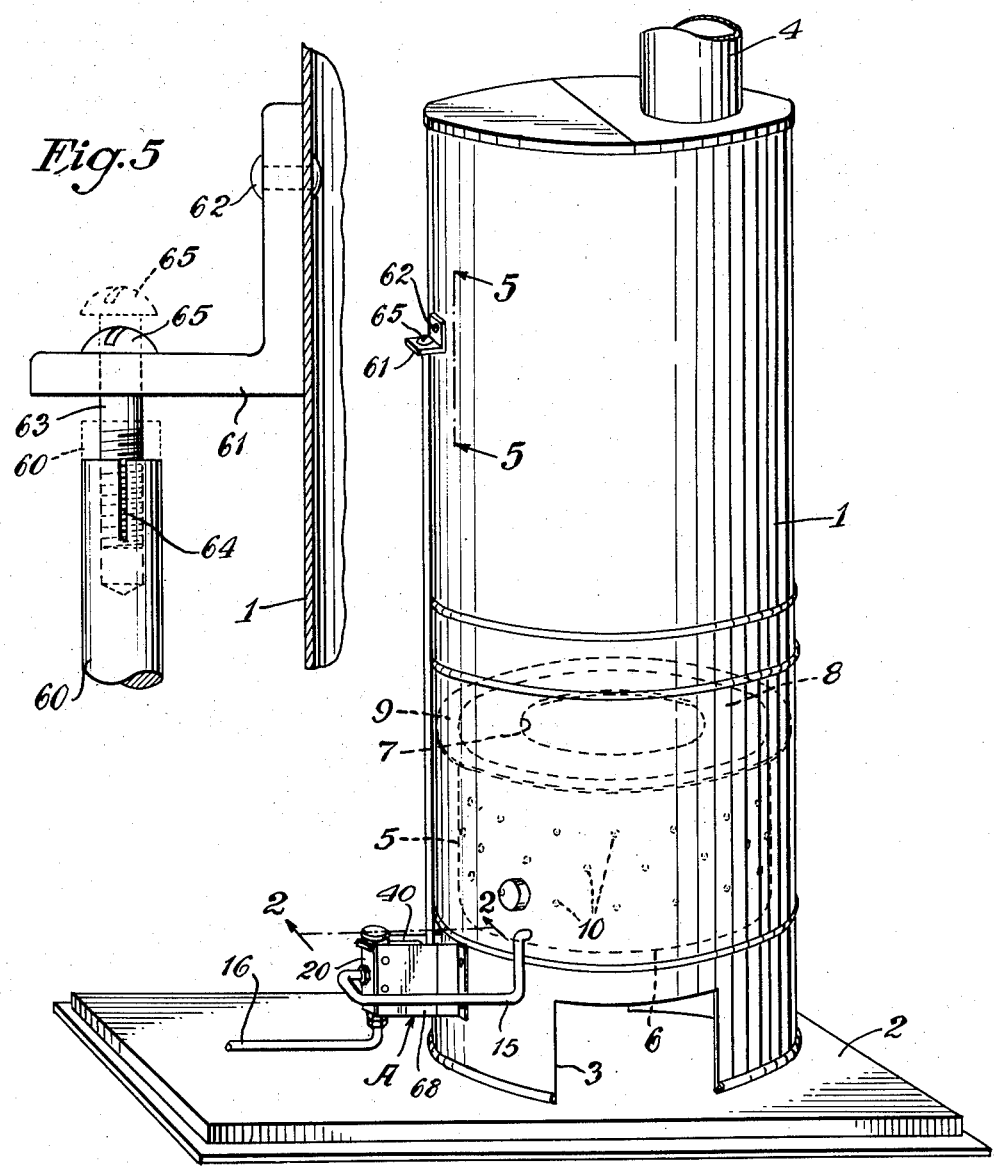
Figure 1 is a perspective view, with parts in skeleton, of a space heater to which my control system is applied.
Figure 5 is a section, on an enlarged scale, on the line 5—5 of Figure 1.

Referring, first, to the form of Figures 1 to 5, inclusive, 1 generally indicates any suitable space heater housing, herein shown, as a matter of illustration, as a cylindrical element resting upon any suitable base 2. The lower part of the cylindrical element is shown with cutaway portions or air inlets 3. 4 is any suitable stack or flue through which the products of combustion pass. Since the details of the burner, as such, do not, of themselves, form part of the present invention, they are shown merely schematically, and in skeleton outline, in Figure 1. 5 is a generally cylindrical burner pot which will be understood to have a closed bottom 6. 7 is a top outlet aperture surrounded by any suitable baffle or flame ring 8.

It will be understood that the space between the outer cylindrical wall of the pot 5 and the surrounding drum is closed as by any suitable flange 9. The air admitted through the air inlet apertures 3 passes through a plurality of air inlet apertures which are spaced circumferentially about the pot wall 5 and are located at various distances from the ends of the pot. They are indicated, for example, at 10. Liquid fuel is supplied to the bottom of the pot through any suitable fuel supply duct 15. This duct extends from any suitable control unit, later more fully described, and generally indicated as A, as in Figures 2 and 4. Fuel is supplied to the control unit from a suitable fuel source, through the pipe 16.

In considering the control unit A, it includes a sleeve or fitting 20 with a liquid fuel inlet passage 21 which is positioned and connected to receive fuel delivered along the pipe or duct 16. The fitting may be supported on the bracket side plates 68. The passage 21 is shown as terminating at its upper end in any suitable valve seat 22, which may be of any suitable form. It is herein shown, as in Figures 2 and 4, as the angular intersection of the inner surface of the passage 21 with the horizontal surface of the seat or bottom 23 of the upper bore 24. The upper bore of the sleeve or fitting 20 is of substantially greater diameter than the lower passage 21. It is in communication with the pipe 15, it being understood that any liquid fuel which passes the valve seat 22 flows therethrough to the burner. Whether the feed is maintained by gravity or by pump means is immaterial.

The flow of liquid fuel past the valve seat 22 is controlled by the valve stem 30 which carries, at its lower end, a valve head 31 having a tapered valve surface 32 adapted to engage the seat 22. The valve stem 30 is normally biased toward valve closing position, as by any suitable coil spring 34 compressed between the upper washer or abutment ring 35 and the lower abutment 36 on the valve stem 30. 37 is any suitable seal or O-ring normally effective to prevent leakage of fuel upwardly about the stem 30.

The valve stem 30 is adjustably received by a transversely extending member 38. The adjustment may, for example, be by the relative screw-threading of the two parts, as at 39. The member 38 is in the form of a cross-bar or rod which overlies a control lever or trigger 40. This lever 40 is supported by any suitable fulcrum or blade 41. The opposite end of the lever is supported upon an adjusting and release assembly which includes a stem 50 and a top cam head 51. As will be clear from Figures 2 and 4, the lever 40 has a bottom recess 42 near its right-hand end, referring to the position of the parts as shown in Figure 2, the recess 42 ending at one end in an inclined surface 43 and at the opposite end in a surface 44 which bounds a downward projection 45.

Figure 4:
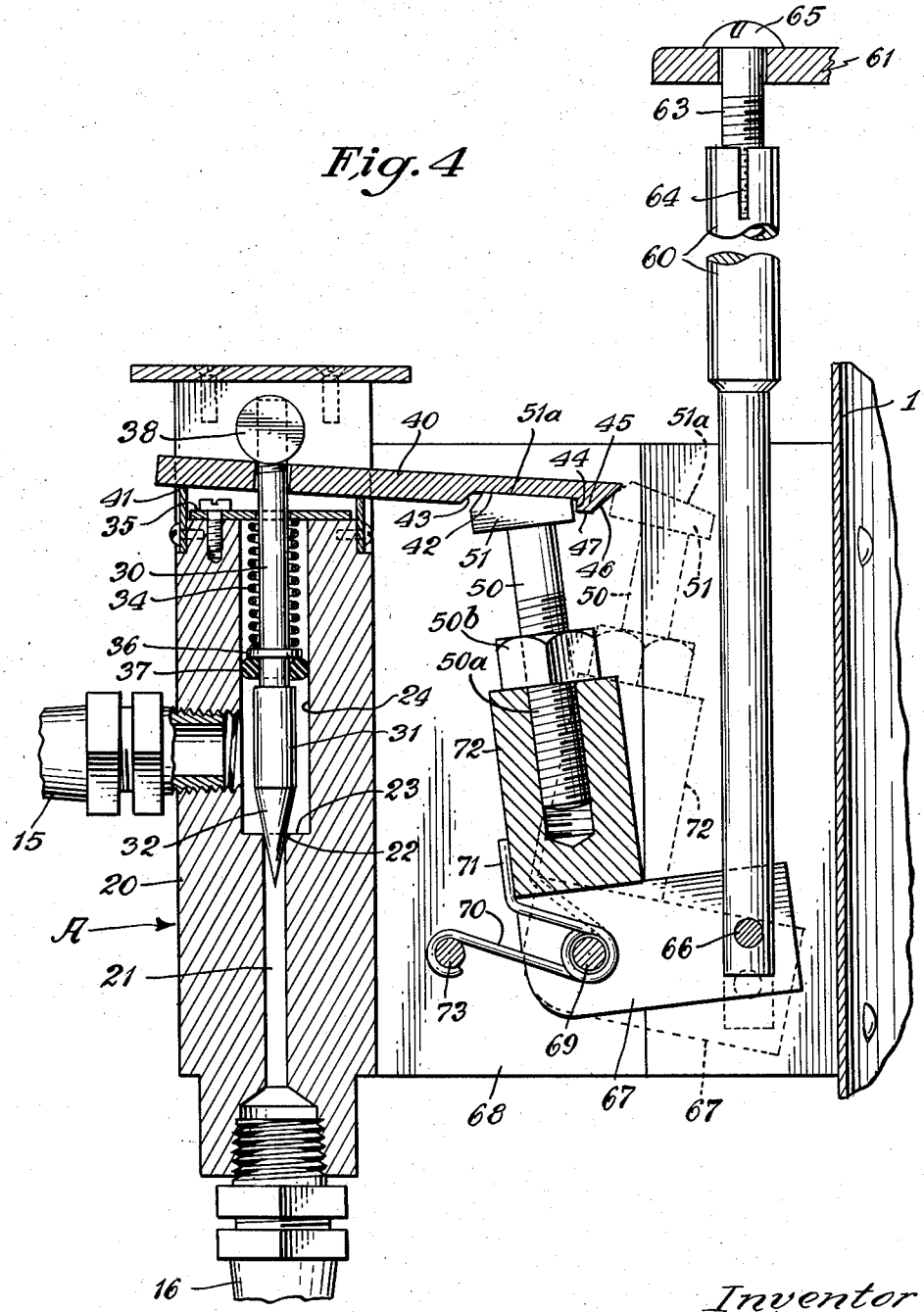
Figure 4 is a view similar to Figure 2, illustrating the parts in two different shut-off positions.
Figure 8:
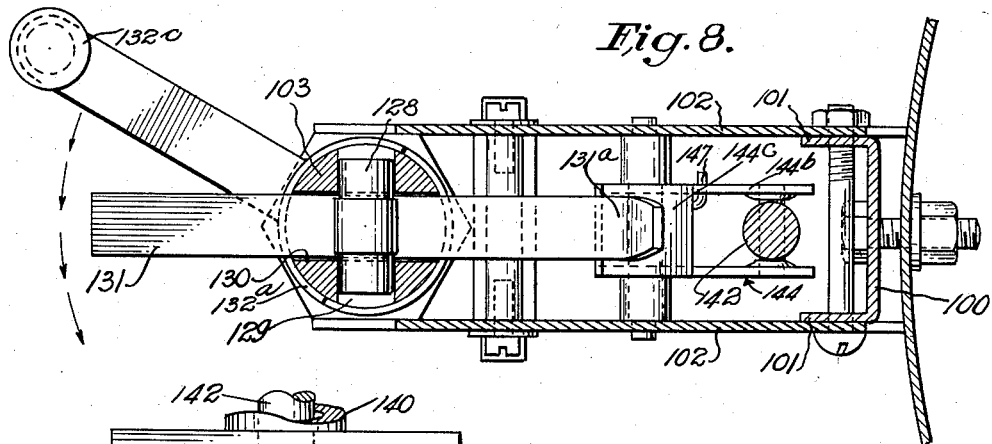
Figure 8 is a section on the line 8—8 of Figure 7.

The projection 45 has an end inclined surface 46 and a bottom surface 47, the bottom surface 47 connecting the surfaces 44 and 46. It will be understood that as the lever 40 is raised or lowered the valve stem 30, and thus the valve surface 32, is likewise raised and lowered. When the lever 40 is lowered to its bottommost position, as shown in Figure 4, the spring 34 is effective to force the valve surface 32 against the valve seat 22 to cut off the flow of fuel to the burner.

In order to control the position of the lever 40, and thus of the valve stem 30, to provide a cut-off in response either to overheating or to failure of the burner, I provide the following structure: The rod 60 is supported at its upper end upon a bracket 61 secured to an upper portion of the drum 1, as at 62. I illustrate the rod as freely suspended upon the bracket 61, for example, by means of an adjusting screw or pin 63 having its shank received, for example, in the split end of the rod, as at 64. The head 65 of the pin 63 rests upon the bracket 61.

The lower end of the rod is secured, as at 66, to a lever 67, pivotally mounted between the bracket side plates 68, as shown, for example, in Figure 3. The lever 67 is rotatable about any suitable pin or rod 69, and is normally urged to the position in which it is shown in Figure 2, by any suitable coil spring 70, one end of which, as at 71, is shown as thrusting against the upward extension or sleeve 72 of the lever system 67. The opposite end of the spring engages the abutment 73, which may be in the form of a pin extending between the bracket side plates 68.

The head 65 is sufficiently spaced from the top of the rod 60 to permit the rod to move upwardly, or the bracket to move downwardly in relation to the rod. For example, if the lever 67 and the camming head 51 are in the "hot" position of Figure 4, the fuel flow ceases, and the burner drum 1 then cools down. As it does, it shrinks. The clearance between the head 65 and the top of the rod 60 is sufficient to permit this shrinkage to take place when the camming head 51 is in the full-line position of Figure 4.

The above described pin or screw 50 is adjustable in the sleeve 72 as by the screw threads 50a. 50b is any suitable lock nut for securing it in adjusted position.

The head 51 is provided with a major cam surface 51a which, during the operation of the burner, engages some part of the bottom surface 47 of the downward end projection 45 of the lever 40. Thus, within a desired range, the cam surface 51a supports the bottom surface 47. As the lever 67 is rotated about its pivot 69 the height of the support varies, and thus the lever 40 moves upwardly or downwardly, controlling the gap or the contact between the valve surface 32 and the valve seat 22. Whereas I may employ any suitable means, responsive to changes in the heat conditions of the burner, I find a Nilvar rod satisfactory, since, as the space heater shell 1 expands when heated, in relation to the rod 60, it lifts the rod. And, similarly, as the shell 1 cools, it shrinks, and lowers the rod 60.

In considering the practical use of the device, I find it important, as stated above, to cut off the fuel supply completely, both at the hot limit and at the cold limit. In Figure 4, I illustrate the extreme hot position, in which the head 51, with its cam surface 51a, is received within the bottom recess 42 of the lever 40. When the cam surface 51a ceases to support the opposed overlying surface 47 of the downward lever projection 45, the valve stem 30 is no longer supported sufficiently to prevent the spring 34 from forcing the valve surface 32 into the closing position in which it is shown in Figure 4. Thereafter, the burner cannot again be started until the operator manually resets the device, by lifting the inner end of the lever 40 and by thereby raising the valve stem 30 against the compression of the spring 34. Assume, however, that the burner fails, or goes out, the lever 67 is dropped to the dotted-line position of Figure 4, and in this extreme position the supporting head 51 and its cam surface 51a are removed in the opposite direction from a supporting relationship with the projection 45. The lever 40, under those circumstances, again drops to the position in which it is shown in Figure 4.

Thus, in both extremes, namely, overheating and stoppage of combustion, the lever 67 and the supporting camming head 51 supported thereby, are moved to a position to cause a complete cut-off of fuel flow. But at any range of burner temperature between the two limits the flow of fuel is modulated and controlled by the variations of the position of the lever 40, and thus of the valve surface 32, in response to variations in burner temperature, and thus in response to variations in the vertical height of the bracket 61 above the pivot 69 and the point of attachment 66 of the bottom of the rod 60 to the lever 67.

Referring to the form of Figures 6 and following, 80 generally indicates a burner pot having a circumferential, generally cylindrical wall 81 and an upwardly concave bottom 82. The wall 81 and the bottom 82 define between them a narrow slot 83 to which a liquid fuel is delivered through the inlet nipple or fitting 84. The wall 81 is provided with a plurality of primary air inlets 85 spaced circumferentially about the pot and located at various levels in the pot. The lowest row 85a is closely adjacent the level of the pot bottom 82. Suitable means for admitting a secondary air supply are indicated at 86. The particular structure shown includes a plurality of closely spaced secondary air inlet apertures arranged in a lower, upwardly inclined row 86a and an upper row 86b. The top of the pot is partially closed by a flame ring 87 having a central aperture 88.

The pot 80 is mounted in a heater structure which is shown as including an outer drum 90 having a plurality of supporting legs 91. Above the supporting legs 91 I illustrate a transverse partition 92 shown as centrally apertured as at 93 to receive a suitable air delivering fan 94 actuated, for example, by any suitable electric motor 95. Positioned a substantial distance above the partition 92 is a burner supporting flange 96 within which the burner pot is supported, for example, by an outwardly extending flange 81a. It will be observed that the space within the drum 90 and about the pot 82 receives an air supply delivered by the fan 94, the entire delivery of air being available for entry through the primary air inlet 85 and the secondary air inlet 86. The space above the burner pot constitutes any suitable flame receiving space A, shown as surrounded only by an upper extension of the drum 90, as at 90a. It will be understood that any suitable flue, not herein shown, is employed for the withdrawal of the by-products of combustion.

Figure 9:
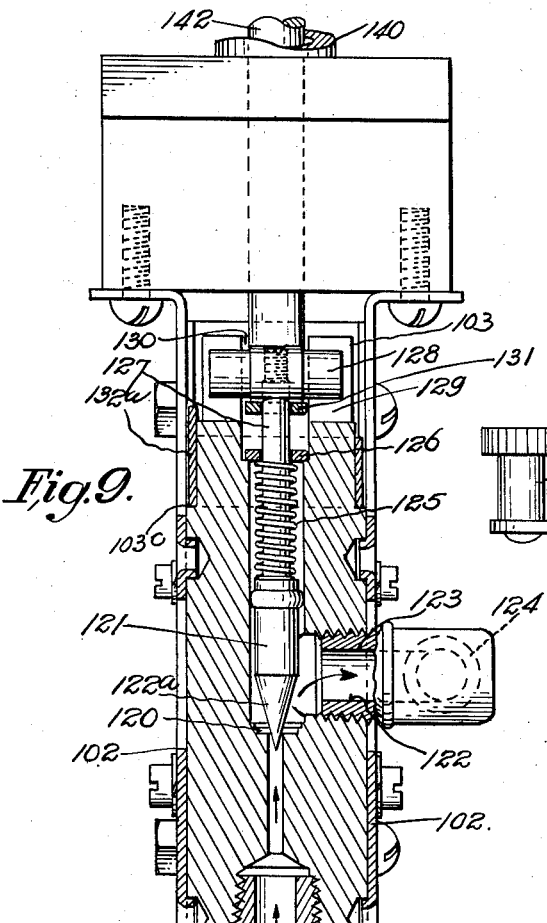
Figure 9 is a section on the line 9—9 of Figure 7.
Figure 10:
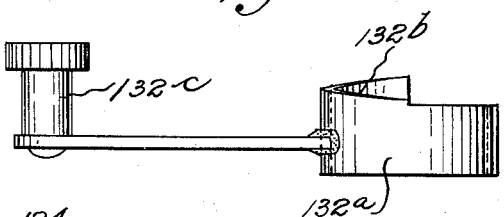
Figure 10 is a detail of a rotary adjusting member shown in section in Figure 9.

To deliver liquid fuel for combustion to the burner pot I employ the control means shown in greater detail in Figures 7 to 10, inclusive. Whereas the control element may be varied in detail, I illustrate it as including an assembly secured to the exterior of the drum 90. As shown, for example, in Figure 8, I may employ a back or channel plate 100 having opposite, outwardly extending flanges 101 from which outwardly extend side plates 102 to the outer extension of which is secured a tubular valve fitting 103. The valve fitting 103 has a screw-threaded bottom aperture 104 to which is secured any suitable inlet duct 105 shown as extending laterally intermediate the ends of a filter duct 106. Within the bore of the filter duct is positioned a filtering spring 107. Liquid fuel from any suitable source enters through the pipe 108. Each end of the filter duct is beveled as at 106a. A closure fitting 109 closes one end of the filter duct, whereas an apertured member 110, secured to the pipe 108, closes the opposite end. Any suitable securing means, such as the nuts 111, may be employed for holding the parts assembled in the position in which they are shown in Figure 7. The filtering effect may be varied by varying the compression of the spring 107 by suitable rotation of the nuts 111. As shown in Figure 9, the liquid fuel so delivered flows past a valve seat 120 controlled by a needle or conically tapered valve head 122a, and escapes through a lateral duct 122, into which extends any suitable screw-threaded fitting 123, which delivers to the liquid fuel delivery pipe 124 and thus to the inlet fitting 84, whence the liquid fuel flows to the narrow trough or channel 83, extending circumferentially about the pot.

The valve element or needle 121, with its tapered or conic head portion 122a, is normally urged toward valve closing position against the seat 120, for example, by the spring 125, which is compressed between the upper end of the valve element or needle 121 and a suitable upper stop or spring limit 126. The valve element itself includes an upwardly extending stem 127 which extends upwardly through the spring abutment 126 and terminates in a cross-head 128. This cross-head may ride in a transverse, diametrically extending slot 129 formed in an upper end of the valve body or fitting 103. A second transverse slot, at right angles to the first, is indicated at 130 in Figure 8. Movable in it is a valve actuating lever or leaf, generally indicated at 131, and shown as spring-held, by the spring 125, against the normally fixed fulcrum element 132. It will be understood that the valve cross-head 128 extends above and rests upon the upper surface of the leaf 131. The leaf 131 is shown as having an upwardly curved or inclined end portion 131a. The normally fixed fulcrum element 132 may advantageously be adjusted. I illustrate it as in the form of an annulus 132a having an upper, generally spiral, inclined camming surface 132b, and a manually operable handle 132c. The annulus surrounds a cylindrical upper surface 103b on the valve element or fitting 103, and seats on the circumferential horizontal surface 103c. Thus the user, by employing the handle 132c, can rotate the annulus 132a and vary the height of the effective fulcrum edge 132b.

In order to provide a heat responsive control for the valve needle 121 I illustrate, in Figure 6, a hollow tube 140 extending through the wall of the drum 90a and into position to receive the direct heat of combustion. It is closed at its upper, inner end by a suitable closure 141 formed to receive the inner end of an Invar rod or the like 142, the opposite end of which, slotted as at 142a, engages the pin 143 which forms part of the below described trigger or adjusting lever structure. In Figure 6, the tube 140 and rod 142 are shown as inclined and extending into the heater. Figure 7 illustrates the same system shown in Figure 6, but illustrates a variant position of the tube 140 and rod 142. The user of the system may dispose the tube 140 and rod 142 on an angle as shown in Figure 6 or may position them in a vertical position as shown in Figure 7. The system operates the same as long as the rod 142 is subject to the temperature variations in or adjacent the heater.

The structure includes a pair of side plates 144 defined by upwardly converging edges 144a and 144b and connected by a cross-piece 144c. The upper edge of the cross-piece normally underlies the valve controlling leaf 131. The side plates 144 are pivoted within and in relation to the side plates 102 of the valve control assembly. The trigger or lever unit thus formed is normally urged in a counter-clockwise direction of rotation, referring to the position of parts shown in Figure 7, by any suitable coil spring 145 having free ends 146 and 147. It will be understood that the effect of a relative increase in the length of the rod 142 in relation to the length of the member 1 is to direct a thrust downwardly against the pin 143, thus tending to rotate the trigger element 144 from the intermediate full-line position of Figure 7 to the dot-and-dash position of Figure 7. On the other hand, an upward movement of the bottom of the rod 142 permits the spring 145 to rotate the trigger element 144 toward the dotted-line position of Figure 7. Full movement from the intermediate full-line position tends to permit the leaf 131 to move downwardly, thus permitting the valve control spring 125 to move the valve needle 121 toward or into fuel cutoff position.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to the specific disclosure herein. For example, whereas I have shown a single valve stem and seat, I may, under certain circumstances, prefer to employ individual valve stems and seats controlling the flow of fuel along the pipes 15 and 16, respectively. It will be understood, also, that whereas I find a rod such as shown at 60, supported on a burner drum, to be a satisfactory heat responsive means for varying the valve position, I may employ other suitable heat responsive means, including, for example, bellows, heat responsive bulbs, fluid systems, and the like. Whereas I apply my system herein to liquid fuel, it may be employed to control the flow of other fluid fuels.

The use and operation of the invention are as follows:

Basically, I provide a valve seat or a fuel regulating system in which I normally modulate the supply of fluid fuel to a burner, by a heat responsive control, while providing a complete fuel cut-off at either end of a predetermined temperature range. Thus, if the burner is extinguished, the operation of the heat responsive control means, after a very short time lag, closes the valve 32 and prevents any further flow whatsoever of fuel to the burner. Likewise, in the event of overheating, the same result ensues, with the control "failing" completely. In each case, in the embodiment of my invention herein shown, the device can be re-started by manual resetting.

It will be understood, for example, that whereas, in the form shown in the present drawings, the valve control is actually obtained primarily by the expansion and contraction of the heater drum 1, I do not wish to be so limited in my claims. Where, in the claims, I employ the term "temperature adjacent the burner," it will be understood that I wish this term to be interpreted sufficiently broadly to read on any means responsive to the heat of the burner itself or of the heater, or responsive to temperature conditions in, adjacent to, or exterior to the burner or heater.

While my invention has a wide variety of applications, it is particularly advantageous in connection with so-called pot type burners which are currently customarily employed with float valve controls. In a pot type burner, if the burner goes out, and if fuel continues to flow, the bottom of the burner may be filled with a substantial puddle of liquid fuel. I find it important and advantageous to ensure that the flow of liquid fuel ceases substantially immediately upon the failure of the burner. Thus, no dangerous amount of liquid fuel can flow into the burner after the fire is out and flooding is completely prevented.

The structure of Figures 6 and following operates generally as the structure of Figures 1 to 5, inclusive, although illustrating differences in detail. Under some circumstances it is advantageous to have the heat responsive assembly 140—142 directly respond ot the heat of combustion. In such a case it may extend above the flame, as shown in Figure 6. With reference, for example, to Figure 7, the structure of Figure 7 may be advantageous to incline or curve the outer end of the leaf 131 so that a manual resetting is not necessary. In other words, the curved or outward end portion 131a of the leaf 131 always overlies the trigger element 144. In this it differs from the arrangement shown in Figure 4, in which a manual resetting may, under some circumstances, be necessary.

The filter assembly of Figure 7 is also advantageous, and the rotary, adjustable abutment 132 is a convenience. However, in both forms of my invention, a valve actuating leaf or lever operates at one end on a fulcrum 41 or 132, and is controlled at the other end by a thermally responsive element which permits the valve to drop to fuel cut-off position, both when the fire goes out and when overheating takes place. In other words, in both forms, the device fails both hot and cold.

I claim:

1. A heat responsive flow regulating and anti-flooding shut-off valve assembly for heaters which includes a valve body having a valve seat in the line of flow of liquid fuel from a fuel supply to a burner in a heater, a movable valve member opposable to said valve seat, yielding means tending normally to move said valve member against said valve seat in the fuel shut-off position, means for normally resisting said movement of the valve member toward the valve seat during a predetermined temperature range, and means for releasing said valve for movement toward said valve seat to closed position in response both to a predetermined maximum temperature at the heater and to a predetermined minimum temperature at the heater.

2. A heat responsive flow regulating and anti-flooding shut-off valve assembly for liquid fuel burners, which includes a valve body having a valve receiving space therein, said valve body being apertured to admit liquid fuel to said space and to withdraw liquid fuel from said space, a valve seat in said space and a valve adapted, when closed against said valve seat, to prevent the flow of liquid fuel from said space, yielding means effective normally to move said valve toward closed position, a pivot element, a lever, one end of which engages said pivot element, a connection between an intermediate part of the lever and said valve and a support for the opposite end of said lever, and means for varying the point of support of said opposite end support with relation to said connection and in response to temperature changes adjacent a burner, whereby to move said lever and therethrough to move said valve member toward and away from said valve seat.

3. The structure of claim 2, characterized in that the pivot element is adjustably mounted on an upper portion of the valve body.

4. The structure of claim 2, characterized in that the pivot element is rotatably mounted for adjustment on an upper part of the valve body and has a lever engaging upper edge portion including parts at various levels.

5. The structure of claim 2, characterized in that the pivot element has a circumferentially extending inclined upper edge portion and is mounted for rotary adjustment about an upper part of the valve body.

6. A fuel supplying system for liquid fuel burners which includes a fuel regulating valve assembly having an inlet and an outlet and valve closure means adapted to regulate the flow of fuel between said inlet and said outlet, and means responsive both to a predetermined maximum temperature and to a predetermined minimum temperature for moving said valve closure means to closed position, said means including a lever connected to the valve closure means, a second lever engaging said first lever, and heat responsive means for moving said second lever in relation to said first lever.

7. A control assembly for controlling the flow of liquid fuel to a liquid fuel burner which includes a base, a valve body on said base, said valve body having therein a valve receiving space and being apertured to admit liquid fuel to said space and to discharge liquid fuel from said space, a valve seat in said space and a valve adapted, when closed against said valve seat, to prevent the flow of liquid fuel from said space, yielding means effective normally to move said valve toward closed position, a lever mounted exteriorly of the valve body, a connection between an intermediate part of the lever and the valve, a support for the outer end of the lever, and means for varying the position of the support with relation to said connection and in response to temperature changes adjacent the heater, whereby to move said lever and therethrough to move said valve member toward and away from said valve seat.

8. The structure of claim 7, characterized by and including, as a support for the lever, a second lever, and heat responsive means connected directly thereto.

9. The structure of claim 7, characterized by and including, as a support for the lever, a second lever, and heat responsive means connected directly thereto, said heat responsive means being constituted by an Invar rod subjected to the heat of combustion of a burner.

10. A fuel supplying system for liquid burners which includes a fuel regulating valve assembly having an inlet and an outlet, and valve closure means adapted to regulate the flow of fuel between the inlet and the outlet, and means responsive both to a predetermined maximum temperature and to a predetermined minimum temperature for moving the valve closure means to closed position, said means including a lever connected to the valve closure means, and positioned normally to hold the valve closure means in valve opening position, a second lever engaging the first lever, and heat responsive means for moving the second lever in relation to the first lever, opposed parts of the levers being formed and adapted to permit the first lever to move to valve closing position in response to a predetermined movement of the second lever in either of two directions, and heat responsive means for moving the second lever, including an element responsive to variations in heat of a heater.

References Cited in the file of this patent

UNITED STATES PATENTS

| | | |
|---|---|---|
| 867,560 | Currey | Oct. 1, 1907 |
| 1,108,772 | Meacham | Aug. 25, 1914 |
| 1,737,585 | Gold | Dec. 3, 1929 |
| 1,814,491 | O'Dowd | July 14, 1931 |
| 2,273,127 | McGoldrick | Feb. 17, 1942 |
| 2,354,755 | Johnson | Aug. 1, 1944 |
| 2,428,867 | De Lancey | Oct. 14, 1947 |
| 2,626,754 | Parker | Jan. 27, 1953 |

FOREIGN PATENTS

| | | |
|---|---|---|
| 66,083 | Norway | Dec. 29, 1941 |